United States Patent [19]
Fentz

[11] Patent Number: 5,458,770
[45] Date of Patent: Oct. 17, 1995

[54] OIL/COOLANT SEPARATOR

[75] Inventor: Jack H. Fentz, Barkersville, Ind.

[73] Assignee: The United States of America as represented by the Secretary of the Navy, Washington, D.C.

[21] Appl. No.: 221,126

[22] Filed: Mar. 31, 1994

[51] Int. Cl.$^6$ .................................................. C02F 1/40
[52] U.S. Cl. .................... 210/168; 210/171; 210/521; 210/538
[58] Field of Search ................................. 210/167, 168, 210/171, 172, 195.1, 242.3, 259, 255, 261, 262, 521, 538, 540

[56] References Cited

U.S. PATENT DOCUMENTS

| | | | |
|---|---|---|---|
| 1,612,557 | 12/1926 | Weisgerber | 210/540 |
| 2,393,498 | 1/1946 | Miller | 210/538 |
| 2,578,040 | 12/1951 | Booth et al. | 210/171 |
| 3,425,913 | 2/1969 | Holden | 210/521 |
| 3,826,740 | 7/1974 | Jewett | 210/521 |
| 4,157,969 | 6/1979 | Thies | 210/521 |
| 4,797,205 | 1/1989 | Kitamura | 210/171 |
| 5,059,312 | 10/1991 | Galletti | 210/172 |
| 5,132,010 | 7/1992 | Ossenkop | 210/540 |

Primary Examiner—Christopher Upton
Attorney, Agent, or Firm—James V. Tura; Susan E. Verona

[57] ABSTRACT

A separator that separates a lubricating oil from a coolant both of which are used in a cutting or grinding machine is disclosed. The separator comprises input, intermediate and output chambers comprising divider panels having top and bottom portions. Every other panel has a passageway near its top region and the alternate panels, relative to the every other panels, have passageways located at their bottommost region. The lubricating oil finds its way into the path of the coolant and becomes mixed therewith. The mixed lubricating oil and coolant is eventually directed into the separator. As the oil and coolant flow sequentially through the chambers of the separator, the separating properties of the oil and the coolant begin to act so that the oil raises to the surface, whereas the coolant tends to seek its way through the chambers of the separator. The resulting separation causes the oil to remain primarily at the surface of the first few chambers, whereas the coolant continues along through the separator until it achieves a state whereby it is substantially uncontaminated by oil so that the uncontaminated coolant may be recycled back into coolant tanks of the machine.

6 Claims, 10 Drawing Sheets

OIL/COOLANT SEPARATOR

The invention described herein may be manufactured and used by and for the Government of the United States of America for governmental purposes without the payment of any royalty thereon or therefor.

BACKGROUND OF THE INVENTION

The present invention relates to an oil/coolant separator and, more particularly, to a machine with a cutting tool or grinding wheel requiring a cooling fluid and having a separator that isolates machine lubricating oil from the coolant with such a high degree of purity that the coolant may be recycled back through the machine.

Machines having cutting tools or grinding wheels are used in metal shaping operations and remove metal from a work piece. Since metal is being removed, the tools and grinding wheels must be hard and retain their hardness as well as their cutting edge even at elevated temperatures, which are reached because of friction created by the cutting or grinding. To lower operating temperatures of the cutting and grinding devices, the associated machines have provisions to supply and direct a cooling fluid over the cutting tool or grinding wheel.

The machines that incorporate the cutting tool or grinding wheel have provisions for storing lubricating oil and the cooling fluid commonly comprising a commercially available coolant, conveying the coolant to the cutting tool or grinding wheel, recapturing the coolant after it has flowed over the cutting tool or grinding wheel and returning the coolant to storage tanks, commonly termed coolant tanks. In the machines related to the present invention, after the coolant flows over the cutting tool or grinding wheel it runs off of, onto and into the machine so as to intermingle with and pick up and gather oil that is being used to lubricate the moving elements, such as the bearings, of the machine. The machines commonly have provisions, such as an oil skimmer, for removing some of the lubricating oil from the coolant after the coolant, carrying along with the lubricating oil, is allowed to enter the coolant tanks. It is desired to remove or separate the lubricating oil from the coolant so that the oil does not find its way onto the workpiece being cut or grinded by the machine whereby it may form an oily film thereon and also so that it does not interfere with the cooling function of the coolant. The oil skimmer may have a round wheel that rotates on the surface of the coolant in the coolant tanks and skims off lubricating oil from the surface, along with coolant, that is passed onto settling tanks that allow the oil to be retrieved therefrom. Unfortunately, a vast majority of the coolant contained in the settling tanks is not fit to be recylced back to the coolant tanks and is treated as contaminated coolant that must be handled, treated and disposed of as a hazardous waste. It is desired that means be provided to reduce the amount of contaminated coolant by more efficiently removing the lubricating oil from the coolant so that a great majority of this coolant, substantially devoid of lubricating oil, may be recycled back to coolant tanks of the machine.

SUMMARY OF THE INVENTION

The present invention is directed to an oil/coolant separator that isolates the oil and the coolant from each other so as to obtain a higher enough purity so that the coolant may be recycled back onto the cutting tool or grinding wheel and to the coolant tank of a machine.

The invention is particularly suited for use in a machine having a cutting tool or grinding wheel operated at elevated temperatures because of the friction created by the cutting or grinding. The machine has provisions for supplying and directing a coolant over the cutting tool or grinding wheel. The machine further has provisions comprising a coolant tank, a coolant pump, a lubricating oil supply reservoir including an oil pump and a distributing system for delivering the oil to parts of the machine requiring lubrication, means for delivering the coolant to a cutting tool and more particularly to the grinding wheel. In a machine particularly suited for the practice of the present invention, the coolant is directed to, intercepts and flows off of the cutting tool or grinding wheel, where it comes into contact with lubricating oil either on the surface of the machine or within partially enclosed cavities that houses the parts of the machine requiring lubrication. The coolant and oil become intermingled and the coolant is directed back, by conduit means, into the coolant tank carrying with it the intermingled lubricating oil. The machine further comprises means, such as an oil skimmer, for removing oil that found its way into the coolant tank. The oil skimmer is positioned so that it skims oil from the surface of the coolant contained in the coolant tank. The skimmer captures oil from the surface along with a coolant thereat. The captured coolant and oil are delivered to the separator of the present invention. The separator comprises a container, a plurality of divider panels and a hollow body. The container has predetermined length, width, and depth dimensions selected to establish a predetermined volume for holding the received coolant and oil. The container further comprises a bottom, opposite end walls, and opposite side walls. The plurality of divider panels have first and second panels respectively spaced apart from the opposite end walls to respectively form input and output chambers. The input channel receives the coolant and oil. The remaining dividing panels are spaced apart from each other and from the input and output chambers by a predetermined distance to form intermediate chambers. The divider panels are arranged so that every other panel has at least one passageway with predetermined dimensions located in its top region at a predetermined distance and the alternate divider panels have at least one passageway with predetermined dimensions located at its bottommost region. The hollow body has a predetermined height and is located in the opposite wall that forms the output channel at a predetermined distance from the bottom of the container. The hollow body carries the coolant, substantially free from the oil, outward from the container when the received coolant and oil, exceeds the predetermined volume for holding the received coolant and oil. The excessive coolant is directed into the cooling tank while the oil remains in the separator container.

Accordingly, it is an object of the present invention to provide a machine having a cutting tool or grinding wheel with a free flowing coolant that may come into contact with and gather up lubrication oil, but which coolant is freed from such oil by a separator so that the coolant may be returned to the coolant tank and again be made available for the cooling of the cutting tool or the grinding wheel.

It is another object of the present invention to provide a separator that isolates the oil from the coolant in such a manner to obtain a high enough purity so that the coolant may be recycled back to the machine for cooling purposes, rather than be treated as hazardous waste.

It is a further object of the present invention to reduce the cost of operating the machine having the cutting tool or grinding wheel by reducing the amount of the coolant that is normally required to replenish the coolant supply.

3

Other objects, advantages and novel features will become apparent from the following detailed description when considered in conjunction with the accompanying drawings.

DETAILED DESCRIPTION OF THE PREFERRED EMBODIMENTS

Figure 1:
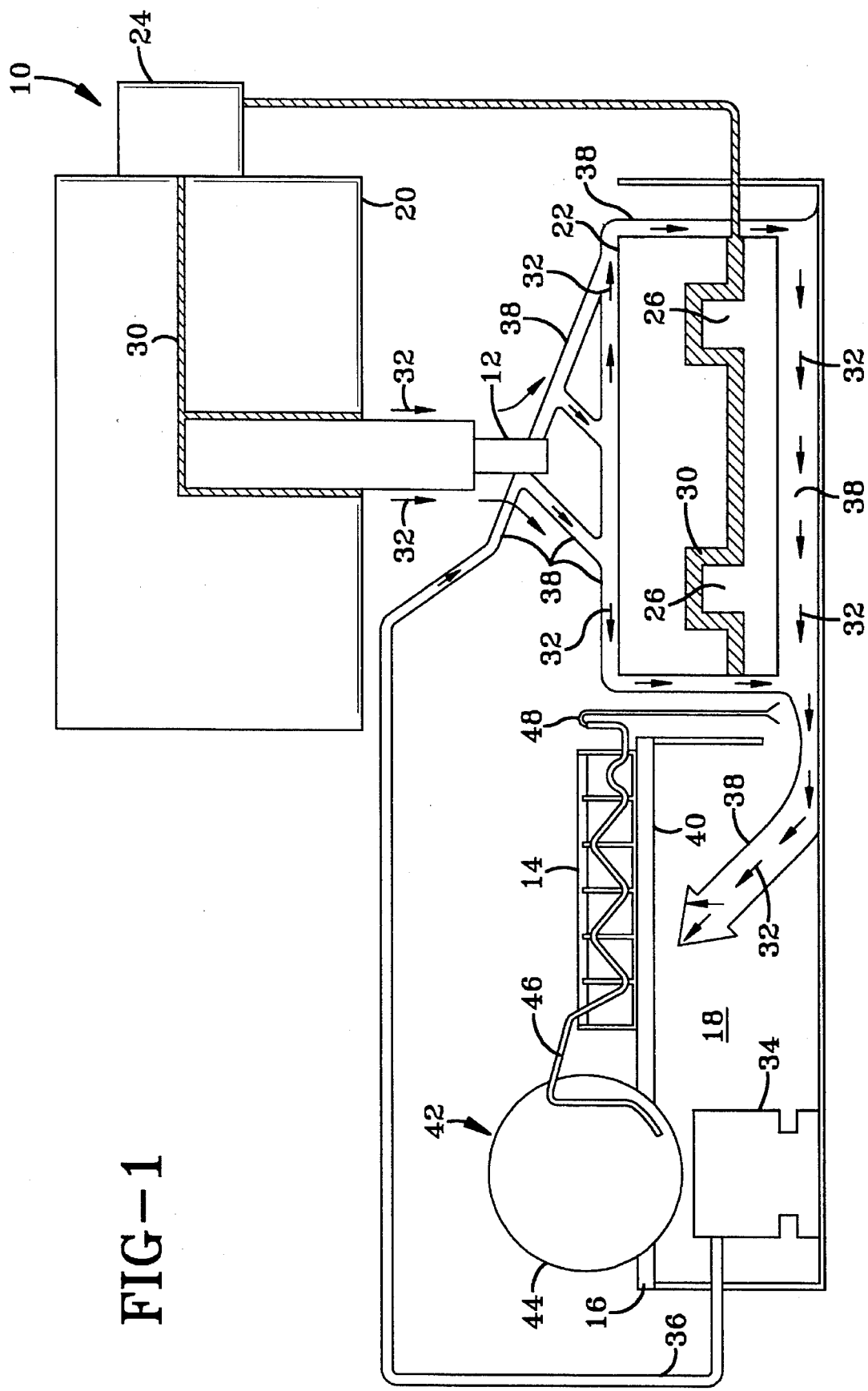
FIG. 1 is a schematic generally illustrating the interrelationship between the oil/coolant separator of the present invention and a machine having a cutting tool, e.g., grinding wheel that is particularly suited for the practice of the present invention.

With reference to the drawing, wherein the same reference numbers are used to indicate the same elements, FIG. 1 is a schematic illustrating the primary elements of a machine 10 incorporating the oil/coolant separator 14 of the present invention. The principles of the present invention apply to various metal shaping machines having cutting tools, but are particularly suited for the machine 10 having a grinding wheel 12.

In general, the grinding wheel 12 removes, by grinding, metal from the work piece (not shown) being processed by the machine 10. If the grinding wheel is to perform properly it should retain its hardness and its grinding surface at elevated temperatures which are reached because of friction created by the grinding. To lower the operating temperatures of the grinding wheel, the machine 10 has provisions to direct a coolant, stored in one or more coolant tanks, over the grinding wheel.

The machine 10 of FIG. 1, except for the oil/coolant separator 14 of the present invention, comprises a plurality of elements all known to those skilled in the art and not requiring a detailed discussion herein, but rather only requiring a sufficient discussion so that the principles of the present invention may be clearly appreciated. The machine 10, as part of its provisions for supplying and directing coolant over the grinding wheel, comprises a coolant tank 16 which contains coolant generally indicated with reference number 18. The coolant 18 used for cooling relatively large devices, such as the grinding wheel 12, is well known in the art and may comprise the substance "TRIM SOL" commercially available from Master Chemical Corporation of Perrysburg, Ohio or may comprise the product identified as "Hangsterfer's S-500" commercially available from Hangsterfers Laboratories, Inc., of Mantua, N. J. Furthermore, the practice of the present invention is equally applicable to ordinary water serving as a cooling fluid.

The machine 10 may be described, for the sake of clarity, as having an upper section 20 which holds and has provisions for operating the grinding wheel 12, and a lower section 22 which holds and operatively moves the workpiece being grinded by the grinding wheel 12. Furthermore, the machine 10 comprises a lubricating oil supply and pump assembly 24 that supplies the lubricating oil to moving elements of the machine, such as the spindle bearings 26 of the section 22. The machine 10 requires a substantial amount of lubricating oil which is sometimes termed "tramp oil." The lubricating oil is transferred by a distribution network 30, shown in cross-hatch. The lubricating oil finds its way out of the distribution network 30 because of the relatively large amount needed by the machine 10 and because of its possible seepage from internal cavities of the machine 10. The non-confined lubricating oil also flows from the grinding wheel 12 and onto the top surface of the section 22 which may already have lubricating oil thereon. Furthermore, the non-confined lubricating oil may be on many surfaces of the machine 10 and is generally indicated by a plurality of arrows 32, as shown in FIG. 1. As will be further described, this non-confined lubricating oil disadvantageously becomes intermingled with the coolant 18.

The machine 10 delivers the coolant 18 in the coolant tank 16 to the grinding wheel 12 by means of coolant pump 34 and conduit 36. For the purpose of illustrating the relatively large amount of coolant 18 involved and its diversified flow, the coolant 18 which intercepts and flows (splashes-away) from the grinding wheel 12 is shown by a wide path 38, having arrows on its outer sides. The coolant 18 flows OFF (still path 38) of the grinding wheel 12 and comes into contact with the lubricating oil (arrows 32). The coolant 18 intermingles with the lubricating oil and carries the lubricating oil (arrows 32) in its path 38 down along the sides and the bottom of section 22 and into the coolant tank 16. The coolant within path 38 also carries along with it metal chips that have been removed by the grinding wheel 12. As seen in FIG. 1, the path 38 of coolant 18, carrying the lubricating oil shown by arrows 32, is illustrated as an enlarged path within the coolant tank 16 and with the lubricating oil, shown by the arrows 32, rising and seeking the surface 40 of the coolant tank 16 and also being directed toward a means for removing oil, such as oil skimmer 42.

The machine 10 has provisions (not shown) to locate the oil skimmer 42 so that it is operatively positioned to be rotated and to come into contact with the lubricating oil on the surface 40 of the coolant tank 16. The oil skimmer 42 has a round wheel 44 with perforations that rotate and skim the lubricating oil along with coolant from the general region of the surface 40. The skimmed-off lubricating oil and coolant provided by the oil skimmer 42 is schematically shown by a path 46 which flows into the oil/coolant separator 14 of the present invention. The coolant flows out of the oil/coolant 14, by way of path 48, and into the coolant tank 16. The oil skimmer 42, along with other elements of machine 10, is shown in the isometric view of FIG. 2.

Figure 2:
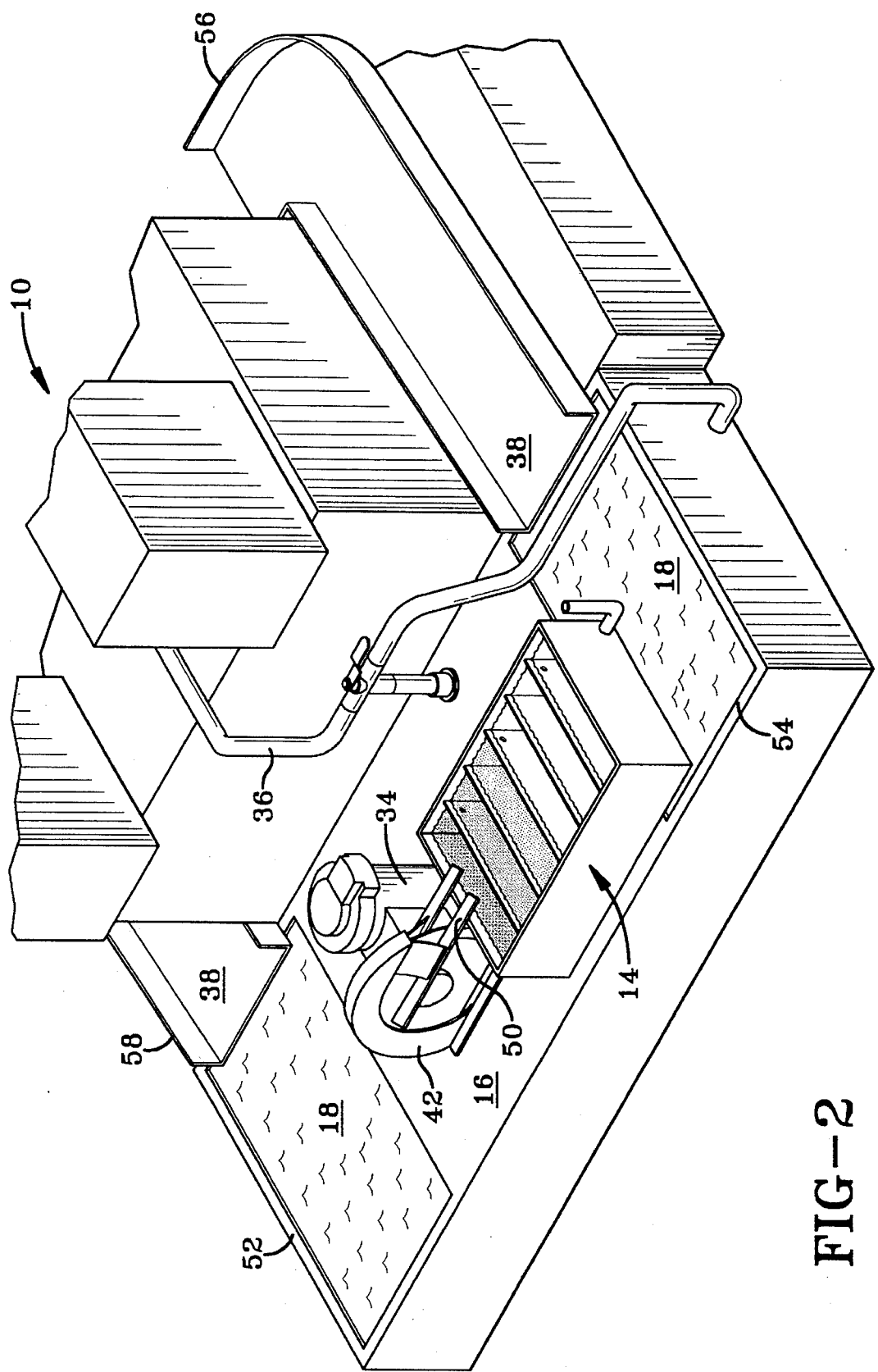
FIG. 2 is an isometric view illustrating the primary elements of the machine of FIG. 1 that incorporates the oil/coolant separator of the present invention.

As seen in FIG. 2, the output (path 46) of the oil skimmer 42 is directed into the oil/coolant separator 14 by a trough 50. As further seen in FIG. 2, the path 38 that carries the coolant 18, the intermingled lubricating oil and the metal chips created by the operation of the grinding wheel 12, flows into both ports 52 and 54 of the coolant tank 16, by way of conduits 56 and 58 respectively. The operation of the present invention may be further described with reference to FIG. 3.

Figure 3:
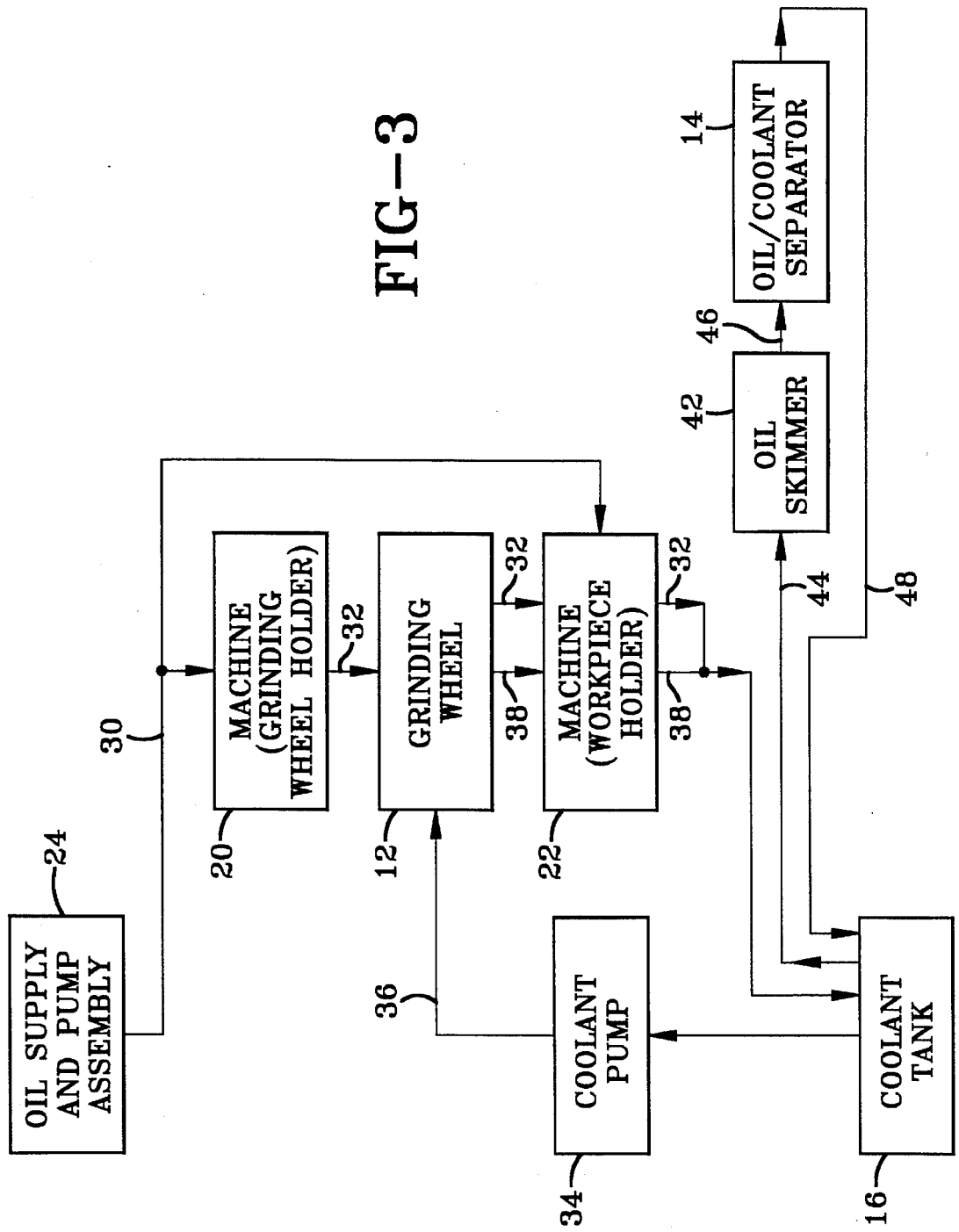
FIG. 3 is a block diagram illustrating the interrelationship of the primary elements of a machine of FIG. 1.

FIG. 3 schematically illustrates the interrelationship of the primary elements of machine 10. In general, FIG. 3 depicts that the coolant 18 in the coolant tank 16 is removed therefrom, directed to the grinding wheel 12, captured and redirected back to the coolant tank 16, but not before allowing the coolant to mix with the lubricating oil of the machine 10. The coolant and lubricating oil are separated from each other by the oil/coolant separator 14 to be more fully described. FIG. 3 indicates the direction of flow between the depicted element by means of arrows which are generally referred to herein as conduits or paths.

The coolant pump 34 removes the coolant 18 from the coolant tank 16 by way of a first conduit 36 and delivers a steady flow thereof to the grinding wheel 12. The grinding wheel 12 also receives lubricating oil that is initially available from the oil supply and pump assembly 24. The lubricating oil is delivered, by way of distribution system 30, to the machine section 20 holding the grinding wheel 12 and to the machine section 22 holding the workpiece being grinded by the grinding wheel 12.

As seen in FIG. 3 and as already described with reference to FIG. 1, the non-confined lubricating oil of machine 10, indicated by paths 32, becomes intermingled with the coolant, indicated by paths 38, and both flow into coolant tank 16, as indicated by path 38. The oil skimmer 42 skims of, shown by path 44, the lubricating oil along with coolant from the surface of the coolant tank 16. The oil skimmer 42 directs, by way of path 46, the skimmed-off lubrication oil and coolant to the oil/coolant separator 14 which, in turn, separates the lubricating oil from the coolant and returns, by way of path 48, non-contaminated coolant to coolant tank 16.

In general, the oil/coolant separator 14 isolates the oil and from the coolant inexpensively and with such a high degree of purity that it is cost effective to recycle the isolated coolant back into the machine 10. The oil/coolant separator 14 may be further described with reference to FIG. 4.

The oil/coolant separator 14 comprises a container 60, a plurality of divider panels 62A, 62B, 62C, 62D, and 62E, and a hollow body 64, such as a pipe, having an exit portion 66. Each of the divider panels 62B, and 62D has a passageway 68 (indicated only for panel 62B for the sake of clarity) and each of the divider panels 62A, 62C and 62E has a passageway 70 (indicated only for panel 62C also for the sake of clarity). However, the divider panels 62A, 62B, 62C, 62D and 62E may have more than one passageway 68 or 70, but only one such passageway is preferred. The container 60 has opposite end walls 72 and 74, opposite side walls 76 and 78 and a bottom generally indicated by reference number 80. The container 60 has a predetermined length 82, a predetermined width 84, and a predetermined depth. The dimensions 82, 84 and 86 are selected to establish a predetermined volume for holding the received coolant and oil. As will be discussed, amounts in excess of this predetermined volume, after the coolant and oil are isolated from each other by the operation of the oil/coolant separator 14, are directed into the coolant tank 16 by way of the pipe 64.

Each of the divider panels 62A, 62B, 62C, 62D, and 62E is spaced apart from each other by a predetermined distance 88 (indicated only between panels 62B and 62C again for the sake of clarity). Similarly, the divider panel 62A is preferably spaced apart from end wall 72 by the same predetermined distance 88 and, furthermore, the divider panel 62E is preferably spaced apart from end wall 74 by the same predetermined distance 88. If desired, the same predetermined distance 88 need not be used, but rather other distances may be used so that the panels are not spaced apart from each other in an identical manner. Each of the divider panels 62A, 62B, 62C, 62D and 62E are located at a distance 90 measured from the top of the container 60. The passageway 68 of divider panel 62B and 62D has its center (indicated for the right side passageway 68 of panel 62B) spaced apart from the end wall 78 by a predetermined distance 92 and also is spaced downward from the top of each respective end panels 62B and 62D by a distance 94. Divider panels 62A, 62C, and 62E have their passageway 70 (indicated for the left side of panel 62C) cut out of their bottommost region and separated from the side wall 76 by a predetermined distance 96. The passageways 70 and 68, have a transverse spacing 98 (indicated for panel 62D) between their centers. The passageways 68 and 70 each have a predetermined diameter 100. The exit portion 66 of the pipe 64 is positioned downward from the top of the opposite side panel 74 by a predetermined distance 102 and has a predetermined diameter 104. All of the predetermined dimensions shown in FIG. 4, as well as FIG. 5, for one embodiment of the present invention are given in Table 1, along with typical values thereof.

TABLE 1

| REFERENCE NO. | PREDETERMINED DIMENSION | TYPICAL VALUE (IN INCHES) |
| --- | --- | --- |
| 82 | Overall length of container 60 | 12.0 |
| 84 | Overall width of container 60 | 8.0 |
| 86 | Overall depth of container 60 | 3.5 |
| 88 | Spacing between divider panel 62A and front wall 72 | 2.0 |
| 88 | Spacing between divider panel 62E and rear wall 74 | 2.0 |
| 88 | Spacing between the divider panels 62A, 62B, 62C, 62D, and 62E | 2.0 |
| 90 | The distance from the top of the container 60 to the top of divider panels 62A, 62B, 62C, 62D, 62E | 0.25 |
| 92 | Spacing from the side of | 0.5 |

TABLE 1-continued

| REFERENCE NO. | PREDETERMINED DIMENSION | TYPICAL VALUE (IN INCHES) |
|---|---|---|
| 94 | divider panel 62B and 62D to the center of passageways 68 The range of distances from the top of divider panel 62B, and 62D to the center of passageway 68 | 0.25 to 0.5 |
| 96 | The distance from the center of passageway 70 to the side wall 76. | 0.5 |
| 98 | The transverse spacing between the center of passageways 68 and 70 | |
| 100 | The diameter of the passageways 68 and 70 | 0.25 |
| 102 | The distance from the top of the end wall 74 to the opening of the pipe 64 | 0.1875 |
| 104 | The diameter of pipe 64 | 0.125 |

The divider panel 62A is spaced from the end wall 72 to form an input chamber 106 and the divider panel 62E is spaced from end wall 74 to form an output channel 108. The pairs 62A-62B, 62B-62C, 62C-62D, and 62D-62E are spaced apart from each other to respectively form intermediate chambers 110A, 110B, 110C and 110D. The divider panels 62A, 62B, 62C, 62D and 62E are arranged so that every other panel (62B and 62D) has at least one passageway 68 located from its top portion by the predetermined distance 94 and the alternate or adjacent panels (62A, 62C and 62E) have at least one passageway 70 located from their bottommost region. The oil/coolant separator 14 may be further described with reference to FIG. 5.

Figure 4:
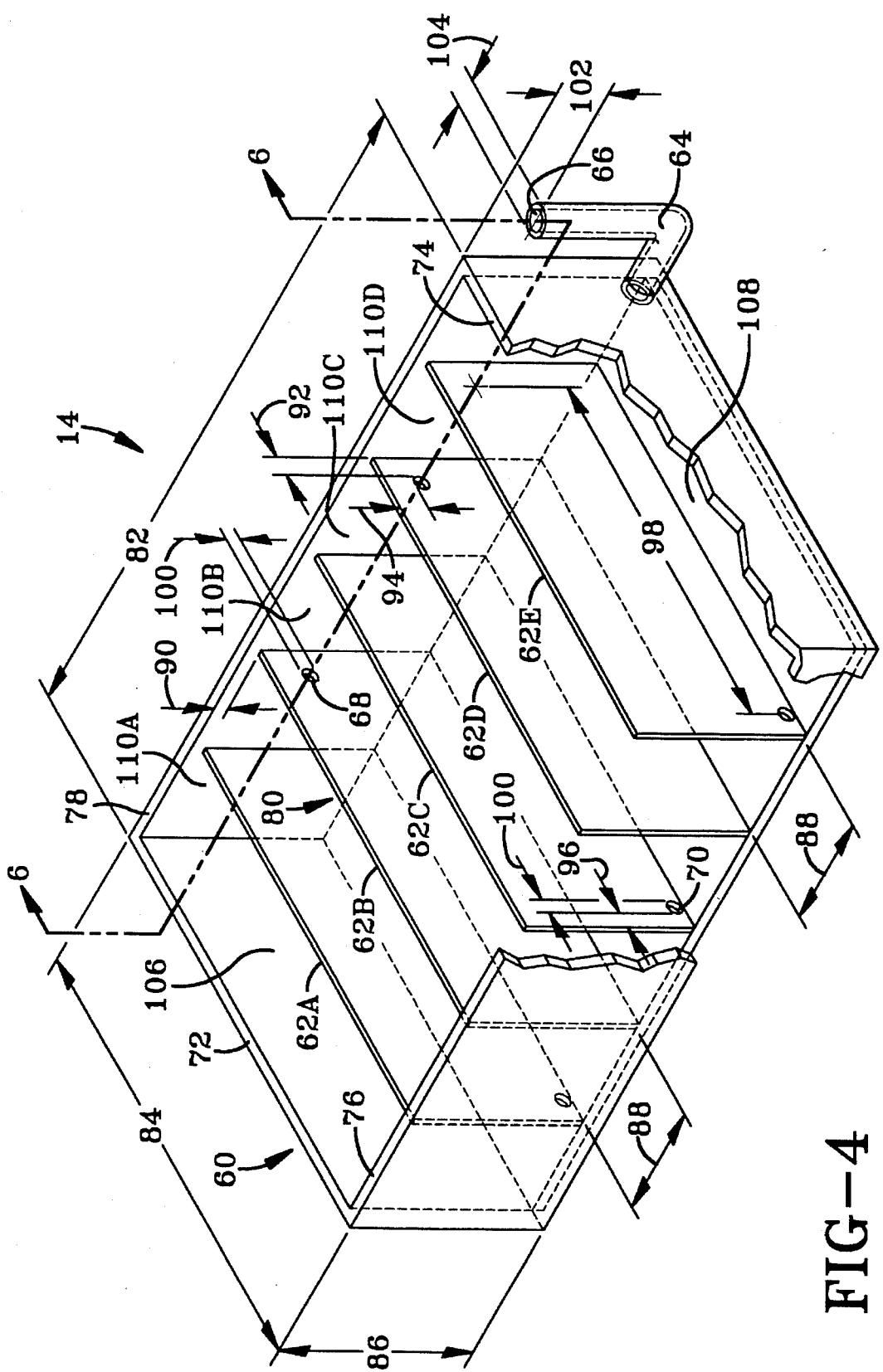
FIG. 4 is a prespective view of one embodiment of the oil/coolant separator of the present invention.
Figure 5A:
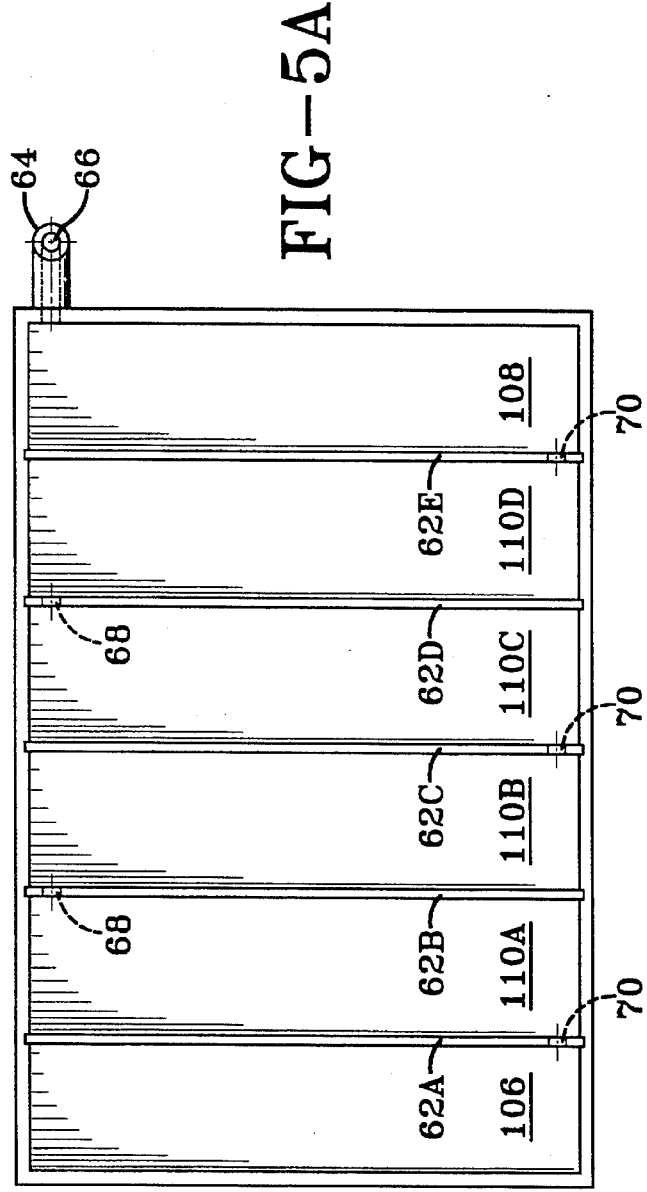
FIG. 5 is composed of FIGS. 5(A), 5(B) and 5(C) respectively illustrating the top, side, and front views of the oil/coolant separator of FIG. 4.
Figure 5B:
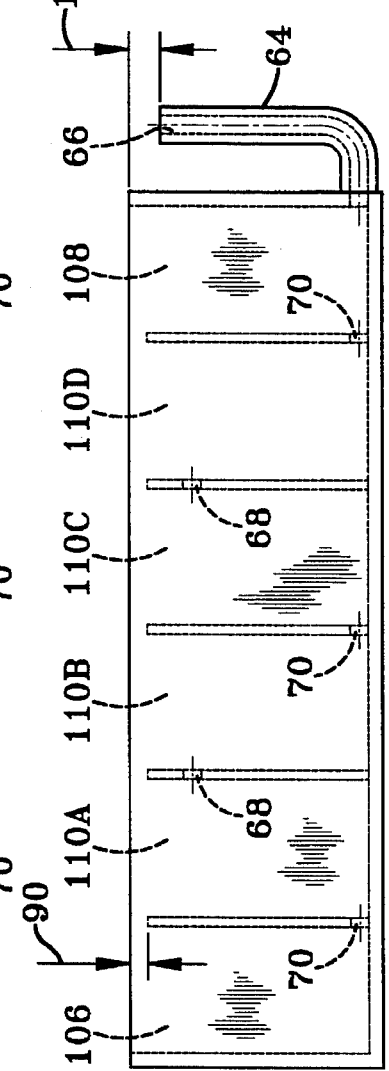
Figure 5C:
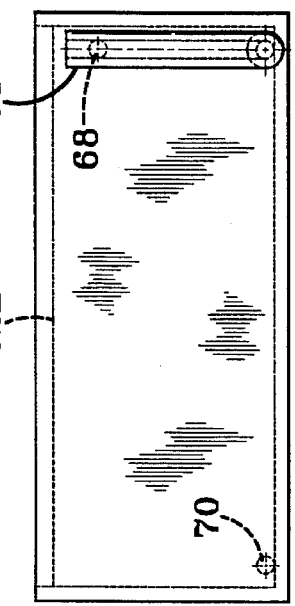

FIG. 5 is composed of FIGS. 5(A), 5(B) and 5(C) respectively showing top, side, and front views of the oil/coolant separator 14. FIG. 5A shows the overall arrangement of the input chamber 106, the output chamber 108 and the intermediate chambers 110A, 110B, 110C, and 110D, as well as the off setting between passageways 68 and 70. FIG. 5(B) more clearly shows the dimension 90 corresponding to the distance from the top portion of the container 60 to the top of the divider panels 62A, 62B, 62C, 62D and 62E, as well as more clearly shows the dimension 102 from the top portion of container 60 to the exit portion 66 of the pipe 64. Furthermore, FIG. 5(B) clearly shows the top-bottom, side-to-side, arrangement of the passageways 68 and 70. FIG. 5(C) most clearly shows the symmetry between the passageways 68 located at the top of the divider panels 62B and 62C and the passageways 70 located at the bottom of divider panels 62A, 62C and 62E. Furthermore, FIG. 5(C) shows that the exit portion 66 of the pipe 64 of the oil/coolant separator 14 is located above the passageways 68. The oil/coolant separator 14 may be further described with reference to FIG. 6, which is a view taken along the line 6—6 of FIG. 4.

Figure 6:
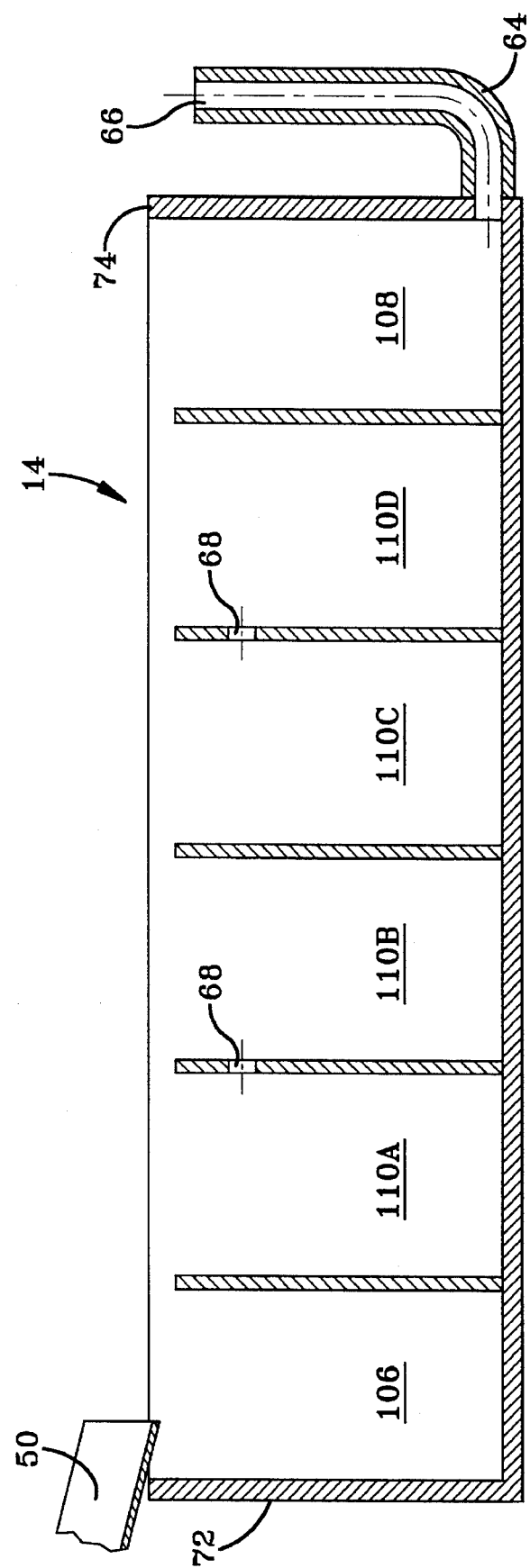
FIG. 6 is a view, taken along line 6—6 of FIG. 4, showing further details of the oil/coolant separator of FIG. 4.

FIG. 6 shows the trough 50 positioned over the input chamber 106. As seen in FIG. 6, the entrance to the pipe 64 is located at the bottommost region of the end wall 74 and the exit portion 66 is located above the upper passageways 68. The shape of passageway 68, as well as that of passageways 70, may be further described with reference to FIG. 7.

Figure 7C:
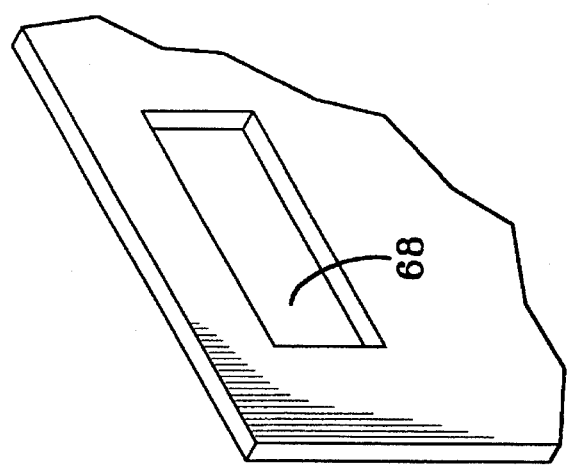
FIG. 7 is composed of FIGS. 7(A), 7(B) and 7(C) showing alternate embodiments of the passageways of the oil/coolant separator of the present invention.
Figure 7B:
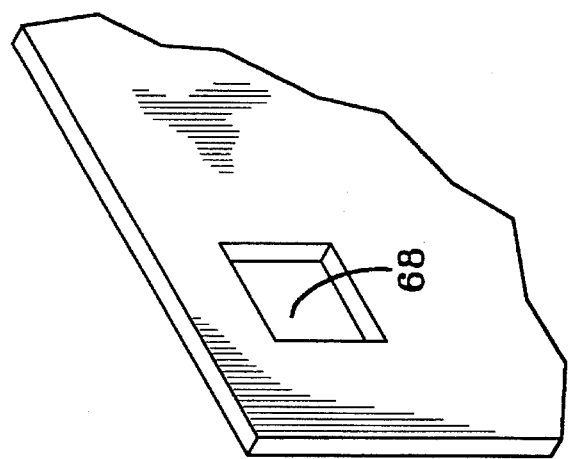
Figure 7A:
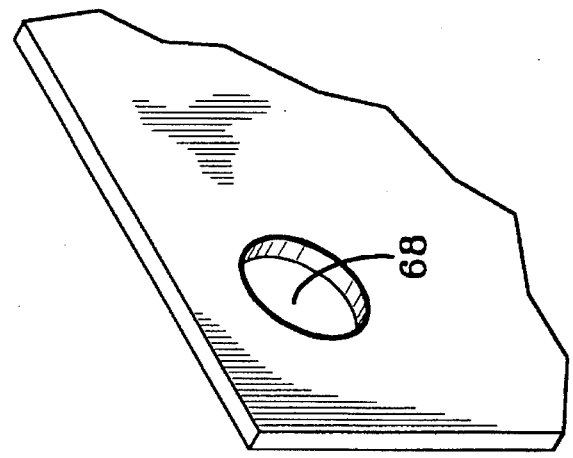
Figure 8A:
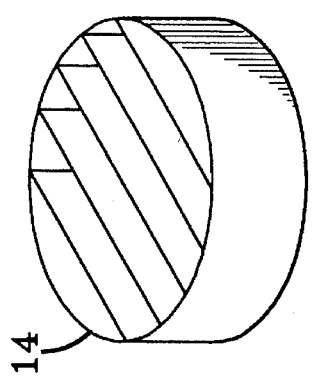
FIG. 8 is composed of FIGS. 8(A), 8(B), 8(C), 8(D), 8(E), 8(F), 8(G) and 8(H) showing various shapes of the oil/coolant separator contemplated by the present invention.
Figure 8B:
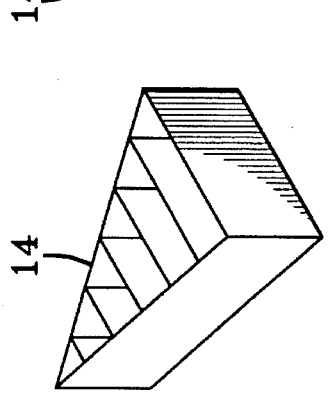
Figure 8C:
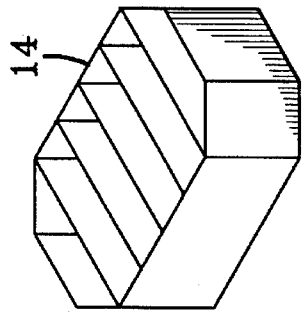
Figure 8D:
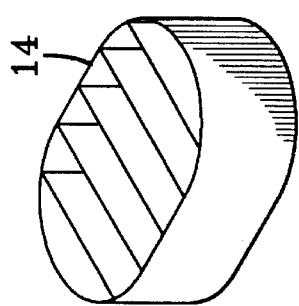
Figure 8E:
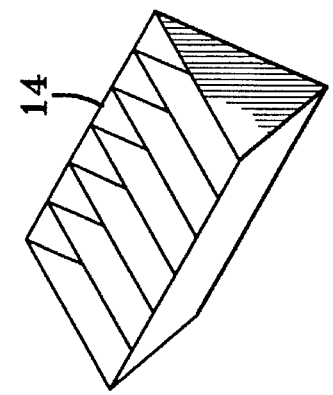
Figure 8F:
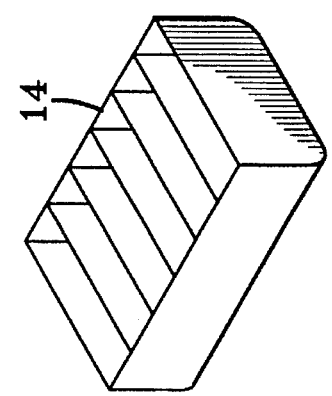
Figure 8G:
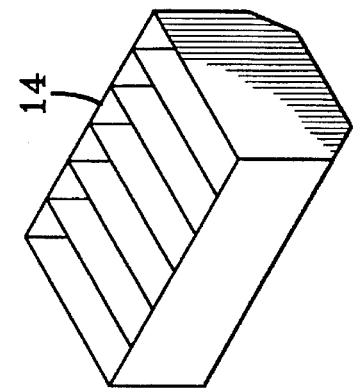
Figure 8H:
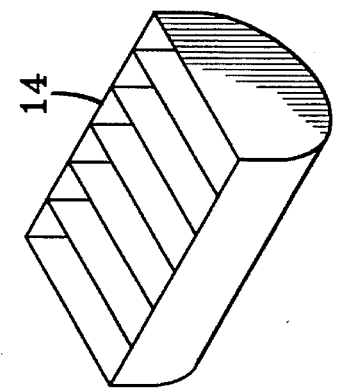

FIG. 7 is composed of FIGS. 7(A), 7(B) and 7(C) respectively illustrating the passageway 68 (and also passageway 70 not shown) as having circular, square and rectangular shapes. From the practice of the invention, it was found the shape of passageways 68 and 70 had little effect on the efficiency of the oil/coolant separator 14. However, the surface area (A) covered by the passageways 68 or 70 appears to yield the best results for the operation of the oil/coolant separator 14 if it is kept proportional to the size of the panels 62A, 62B, 62C, 62D and 62E and to the overall size of the container 60. For example, for the panels 62A, 62B, 62C, 62D and 62E along with the container 60, having the dimensions given in Table 1, it was found that a surface area (A) of 0.05 sq. inches serves well for the passageways 68 and 70. It should be noted, that from the practice of the present invention it was also found that flatness, thickness, and radii of curvature of the panels 62A, 62B, 62C, 62D and 62E and container 60 had little or no effect on the separating efficiency of the oil/coolant separator 14. The oil/coolant separator 14 may take on a variety of shapes, such as that shown in FIGS. 1 and 3–6, as well as the shapes shown in FIG. 8.

FIG. 8 is composed of FIGS. 8(A), 8(B), 8(C), 8(D), 8(E), 8(F), 8(G) and 8(H) showing various shapes of the oil/coolant separator 14 having different quantities of chambers, all of which perform properly to provide for oil and coolant separation of the present invention. However, the selection of the shapes and sizes of the oil/coolant separator 14 do have an effect on the related fabricating techniques and their cost. The operation of the oil/coolant separator 14 may be further described with reference to FIG. 9.

Figure 9:
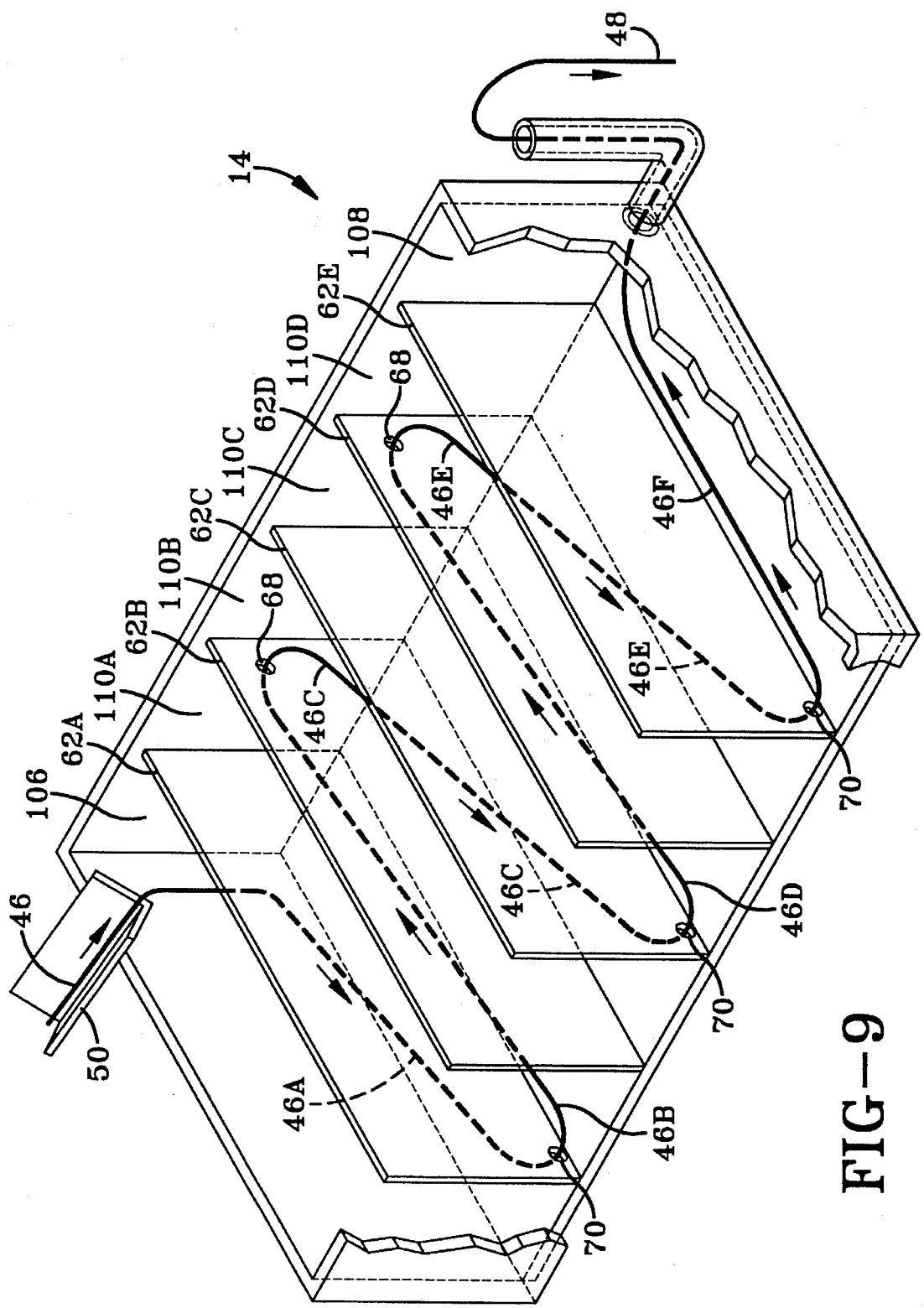
FIG. 9 is similar to FIG. 4 and illustrates the side-to-side path of the oil and coolant within the oil/coolant separator of the present invention.

FIG. 9 is similar to FIG. 4, but in addition thereto, illustrates the side-to-side preferred path 46 of the coolant and lubricating oil after these substances have entered the oil/coolant separator 14 from the oil skimmer 42 by way of the trough 50. The path 46 is interrelated to the chambers of the oil/coolant separator 14, and such interrelationship is shown in Table 2.

TABLE 2

| CHAMBER | PATH 46 PORTIONS |
|---|---|
| 106 | 46A |
| 110A | 46B |
| 110B | 46C |
| 110C | 46D |
| 110D | 46E |

TABLE 2-continued

| CHAMBER | PATH 46 PORTIONS |
| --- | --- |
| 108 | 46F |

The path 46 includes the flow of both the lubricating oil and the coolant. The lubricating oil and coolant from trough 50 is introduced into the input chamber 106. As soon as the lubrication oil and coolant enter the input chamber 106, shown by path portion A, the oil and coolant begin to separate with oil, having the lesser density, rising toward and seeking the surface of the path and, eventually (after a sufficient flow), the surface of the oil/coolant separator 14. As the oil and coolant continue to enter the input chamber 106, the oil and coolant, but primarily the coolant, pours through the passageway 70 located at the bottommost region of the divider panel 62A, but the flow 46A tends to leave a vast majority of the oil behind in the input chamber 106. When the oil and coolant enter the intermediate chamber 110A, the coolant seeks out the passageways 68, located at the top region of divider panel 62B, whereas the oil again tends to rise and seek out the surface and remain thereon. As the oil and coolant continues to enter the input chamber 106, it forces the already present oil and coolant to enter into the intermediate chamber 110B, and, again, the forced coolant tends to seek out the lower passageway 70 of the divider panel 62C, whereas the remaining oil tends to rise and seek out the surface. The separation of the oil from the coolant continues as oil and coolant continue to enter the input chamber 106 and, thereby, forcing the already present oil and coolant to pass through intermediate chambers 110C and 110D, until the oil and coolant find their way into the output chamber 108. When the oil and coolant, primarily the coolant, is at the output chamber 108, the oil and coolant are substantially isolated from each other, and the coolant now being substantially uncontaminated by the oil is allowed to flow out of the output chamber 108 by way of the pipe 64 so that it drips into the coolant tank 16 by way of path 48.

As can be seen in FIG. 9, the path 46 of the oil and coolant being received by the oil/coolant separator 14 has a side-to-side, sine wave pattern. Further, the path 46 also possesses an upward-downward movement. The flow path 46A is downward in the input chamber 106 until it reaches the passageway 70 of panel 62A and then it flows (path 46B) into intermediate chamber 110A. The oil and coolant in chamber 110A does not enter into chamber 110B until the level thereof reaches the level where the passageway 68 is located. The oil and coolant in chamber 110B begins to leave the intermediate chamber 110B as soon as these substances seek out passageway 70 of the panel 62C. This oil and coolant then enter both intermediate chambers 110C and 110D in a manner as already described for intermediate chambers 110A and 110B. Finally, the oil and coolant enter into the output chamber 108 and the coolant is substantially purged of oil. The coolant uncontaminated by oil, leaves the exit portion 66 of the pipe 64 when the oil and coolant being received by the oil/coolant separator 14 exceeds the predetermined volume of the oil/coolant separator 14. The separation of the oil and coolant may be further described with reference to FIG. 10.

Figure 10:
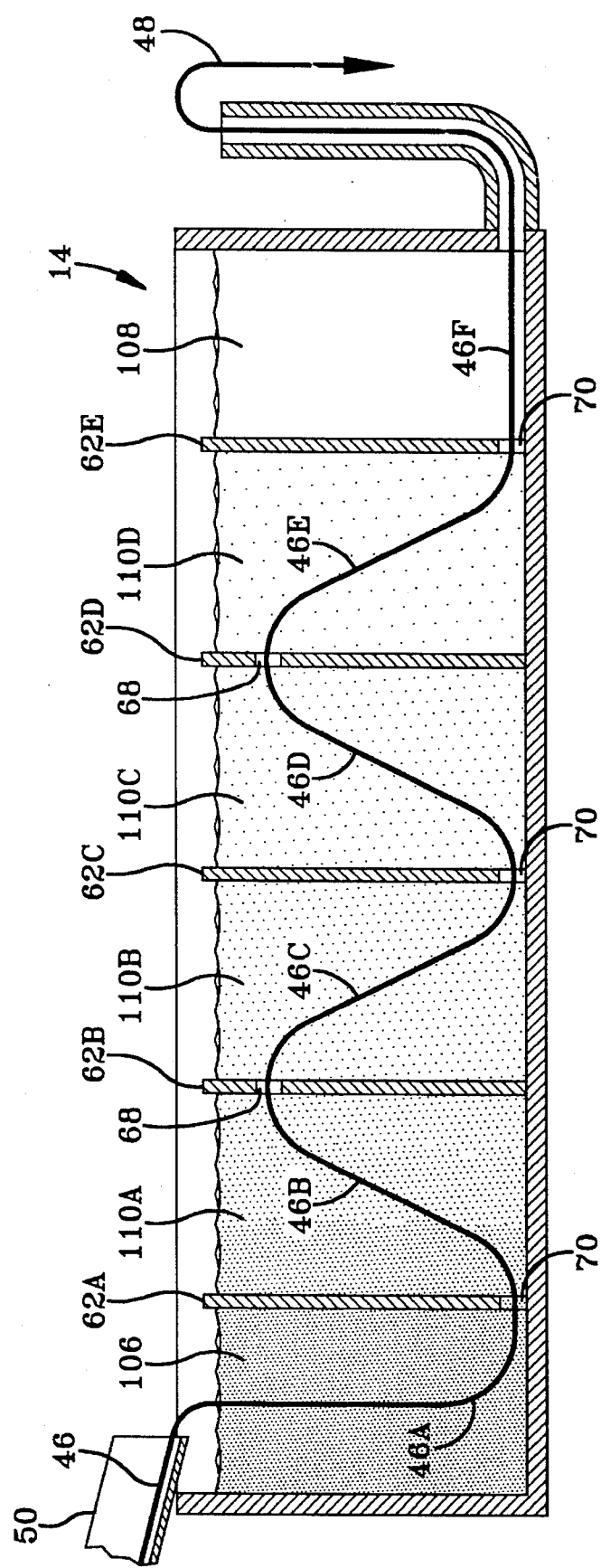
FIG. 10 is also similar to FIG. 9 and illustrates the upward-downward path of the oil and coolant within the oil/coolant separator of the present invention.

As can be further seen from FIG. 10, the oil receives its maximum isolation from the coolant in the input chamber 106 and then its isolation is lessened by decreasing degrees in chamber 110A, 110B, 110C and 110D, until the coolant in the output chamber 108 is substantially free of oil. The degree of separation of the oil and coolant is indicated by speckling in FIG. 10, wherein input chamber 106 is darkly speckled and the output chamber is shown as being devoid of speckling. The coolant in the output chamber 108 is of a high enough purity so that it may be allowed to be recycled back into the coolant tank 16 by way of path 48.

It now should be appreciated that the practice of the present invention provides for an oil/coolant separator 14 that isolates the lubricating oil from the coolant, at such a purity that the coolant may be recycled back to the coolant tank 16 and thereby reduce the need for handling hazardous material, such as contaminated coolant or some other contaminated fluid that was serving as a cooling medium, such as water.

In the practice of this invention, comparative data was derived between the amount of contaminated coolant yielded by a machine having only an oil skimmer and a settling tank into which the oil skimmer fed and the coolant yielded by a machine of the present invention having both an oil skimmer and the oil/coolant separator 14 described herein. During a 24 hour run, a machine that had only an oil skimmer gathered 11 gallons of coolant that was heavily contaminated with oil. Conversely, during a 24 hour run, a machine having the benefits of the present invention gathered only 3 cups of coolant that was heavily concentrated with oil. Such comparative data illustrates that the present invention improves the reduction of the contaminated coolant by a factor of about 60.

Furthermore, in the practice of the present invention samples were taken to show the benefits of the oil/coolant separator 14 cooperating with two different machines. For such a showing for the first machine 10, the amount of oil intermingled with the coolant flowing into the oil/coolant separator 14 was measured and represented 19% thereof. The amount of oil intermingled with the coolant flowing out of the oil/coolant separator 14 was then measured and represented 1.0% thereof. For the second machine 10, similar measurements were taken and the amount of oil intermingled with the coolant flowing into the oil/coolant separator 14 measured 17% thereof, whereas the amount of oil intermingled with the coolant flowing out of the oil/coolant separator 14 measured 0.27%.

It should now be appreciated that the practice of the present invention provides for an oil/coolant separator 14 that reduces the amount of contaminated coolants that need to be handled as hazardous waste.

Although the hereinbefore given description was related to an oil/coolant separator 14 having predetermined values for a particular embodiment, it should be appreciated that the practice of the present invention can provide various other embodiments having different predetermined dimensions all of which can be utilized to reduce the amount of contamination of the cooling fluid, such as the commercially available coolant hereinbefore given or plain water serving as the coolant. For such embodiments, the dimensions for the oil/coolant separator 14 of the present invention should be selected so that a sufficient amount of holding capacity is provided that allows the oil to separate from the coolant as the oil and coolant flow and rise in the chambers of the oil/coolant separator 14. Furthermore, although the present invention has been primarily described for use with a machine having a tool, such as a grinding wheel, the principles of the present invention are equally appicable to any tool that requires a coolant and which coolant finds its way to become mixed with lubricating oil from which it is desired to be purged.

Many modifications or variations of the present invention are possible in view of the above disclosure. It is therefore to be understood, that within the scope of the appending claims, the invention may be practiced otherwise as specifically described.

What I claim is:

1. In a machine having a tool for cutting or grinding operating at elevated temperatures reached because of friction created during cutting or grinding, said machine having provisions for supplying and directing a coolant over the tool, said provisions for supplying and directing said coolant comprising:

(a) a coolant tank containing said coolant;

(b) a coolant pump for removing said coolant from said coolant tank by way of a first conduit and delivering a steady flow thereof to said tool;

(c) a reservoir containing lubricating oil and a pump for removing said oil from said reservoir by way of a second conduit and delivering a flow thereof for lubricating elements of the machine, said lubricating oil becoming intermingled with said coolant;

(d) means for directing said intermingled oil and coolant back to said coolant tank;

(e) means for removing said lubrication oil from said coolant tank, said removal carrying some coolant along with it;

(f) separator means positioned to receive the said removed lubricating oil and said removed coolant and separating said lubricating oil from said coolant, said separating means comprising:

(i) a container having predetermined length, width and depth dimensions to establish a predetermined volume for holding the received lubricating oil and coolant, said container further having a bottom, opposite ends walls, and opposite side walls;

(ii) a plurality of divider panels each fixedly situated at a predetermined location within said container and each having top and bottom portions and with first and second divider panels respectively spaced from said end walls by a first predetermined distance to form input and output channels, said input chamber receiving said lubricating oil and coolant, said remaining divider panels being spaced from each other by a second predetermined distance and from said input and output chambers by a third predetermined distance to form intermediate chambers, said divider panels being situated so that every other panel has at least one passageway with predetermined dimensions located in its top region and alternate divider panels, relative to said other panels, being situated so that at least one passage with predetermined dimensions is located at their bottommost region, said spaced apart divider panels preventing passage of said lubricating oil and coolant except at said passageways in said top and bottommost regions; and (iii) a hollow body having a predetermined height, said hollow body being located in the opposite end wall that forms said output channel at a predetermined distance from said bottom of said container, said hollow body carrying coolant, substantially free of said lubricating oil, outward from the container when the amount of said received oil and coolant exceed said predetermined volume for holding said received lubricating oil and coolant, said excessive coolant being directed into said cooling tank.

2. In a machine according to claim 1, wherein said means for removing said oil from said coolant tank comprises a round wheel and a trough, said round wheel having perforation means that are rotated through the coolant and lubricating oil so as to skim and remove some of said lubricating oil and coolant from the coolant tank.

3. In a machine according to claim 2, wherein said separator means has its input chamber positioned under said trough and its output chamber positioned above said coolant tank so that said excess coolant drips down into said coolant tank.

4. An oil/coolant separator comprising:

(a) a container having predetermined length, width and depth dimensions selected to establish a predetermined volume for holding lubricating oil and coolant, said container further having a bottom, opposite end walls, and opposite side walls;

(b) a plurality of divider panels each fixedly situated at a predetermined location within said container and each having top and bottom portions and with first and second divider panels respectively spaced from said opposite side walls by a first predetermined distance to form input and output chambers, said input chamber receiving said lubricating oil and coolant, said remaining divider panels being spaced from each other and from said input and output channels by a second predetermined distance to form intermediate chambers, said divider panels being situated so that every other panel has at least one passageway with predetermined dimensions located at its top region and alternate divider panels, relative to said every other panels, being arranged to have at least one passageway with predetermined dimensions located at their bottommost region, said spaced apart divider panels preventing passage of said lubricating oil and coolant except at said passageways in said top and bottommost regions; and (c) a hollow body having a predetermined height, said hollow body being located in the opposite end wall that forms said output chamber at a predetermined distance from said bottom of said container, said hollow body adapted to carry said lubricating oil and coolant outward from the container when said container receives an amount of said lubricating oil and coolant that is greater than said predetermined volume for holding said lubricating oil and coolant.

5. The oil/coolant separator according to claim 4, wherein said divider panels are spaced apart from each other and from said input and output chambers by a distance of about 2.0" and said container has a length of about twelve (12) inches, a width of about eight (8) inches and a depth of about three and one-half (3.5) inches.

6. An oil/coolant separator adapted to receive a coolant and lubricating oil and for removing said oil from said coolant, said oil/coolant separator means comprising:

(a) a container having predetermined length, width and depth dimensions selected to establish a predetermined volume for holding said coolant and lubricating oil, said container further having a bottom, opposite end walls, and opposite side walls;

(b) a plurality of divider panels each fixedly situated at a predetermined location within said container and each having top and bottom portions and with first and second divider panels respectively spaced from opposite ends walls by a first predetermined distance to form input and output chambers, said input chamber receiving said coolant and lubricating oil, said remaining divider panels being spaced from each other by a predetermined distance and from said input and output channels by a predetermined distance to form intermediate chambers, said divider panels being situated so that every other panel has at least one passageway with a diameter in the range of about 0.25 to 0.5 inches located at its top region and alternate divider panels being situated to have at least one passageway having a diameter in the range of about 0.25 to 0.5 inches located at their bottommost region, said spaced apart divider panels preventing passage of said lubricating oil and coolant except at said passageways in said top and bottommost regions; and (c) a pipe having a predetermined height and being located in the opposite side wall that forms said output channel at a predetermined distance from said bottom of said container, said pipe carrying the overflow of coolant and lubricating oil out from said container when the amount of said received coolant and lubricating oil exceeds said predetermined volume.

* * * * *